United States Patent

Ames

[11] 4,041,975
[45] Aug. 16, 1977

[54] ARTICULATING PIPE COUPLING AND ALIGNMENT CONTROL ASSEMBLY FOR CENTER PIVOT IRRIGATION SYSTEM

[75] Inventor: Kenneth R. Ames, Walla Walla, Wash.

[73] Assignee: Frontier Machinery Company, Walla Walla, Wash.

[21] Appl. No.: 686,530

[22] Filed: May 14, 1976

[51] Int. Cl.² .............................................. B05B 3/12
[52] U.S. Cl. ..................................... 137/344; 239/177
[58] Field of Search ......................... 137/344; 239/177; 285/5

[56] References Cited

U.S. PATENT DOCUMENTS

| | | | |
|---|---|---|---|
| 3,394,729 | 7/1968 | Bower et al. | 137/344 |
| 3,738,687 | 6/1973 | Zimmerer et al. | 37/344 |
| 3,749,117 | 7/1973 | Garwood | 137/344 |
| 3,766,937 | 10/1973 | Lundvall et al. | 137/344 |
| 3,777,979 | 12/1973 | Ririe | 37/344 X |
| 3,807,436 | 4/1974 | Pringle | 137/344 |

Primary Examiner—Alan Cohan
Assistant Examiner—Gerald A. Michalsky
Attorney, Agent, or Firm—Wells, St. John & Roberts

[57] ABSTRACT

An articulating pipe coupling and alignment control assembly is described for center pivot sprinkler irrigation systems. The assembly interconnects adjacent pipe sections to enable the section to pivot both vertically and horizontally with respect to each other. The assembly includes two spaced pipe section flanges that are affixed to the ends of the pipe sections. Pipe segments are welded to the flanges with a coupling member fitting over ends of the pipe segments to enable water to flow therebetween. The assembly as an external ball and socket interconnection affixed to the pipe segments to enable the pipe sections to pivot about axes of the ball and socket interconnection. An articulating arm assembly is mounted above the ball and socket interconnection for operating a switch activating shaft to maintain the adjacent pipe section in general longitudinal alignment.

7 Claims, 5 Drawing Figures

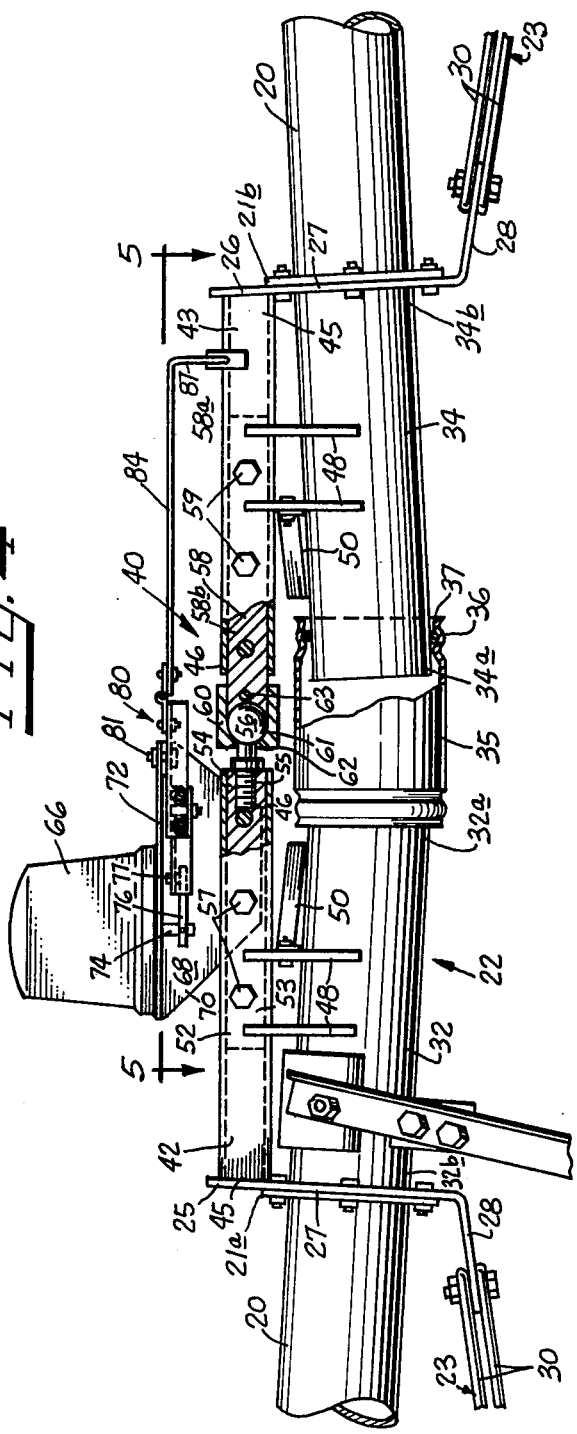
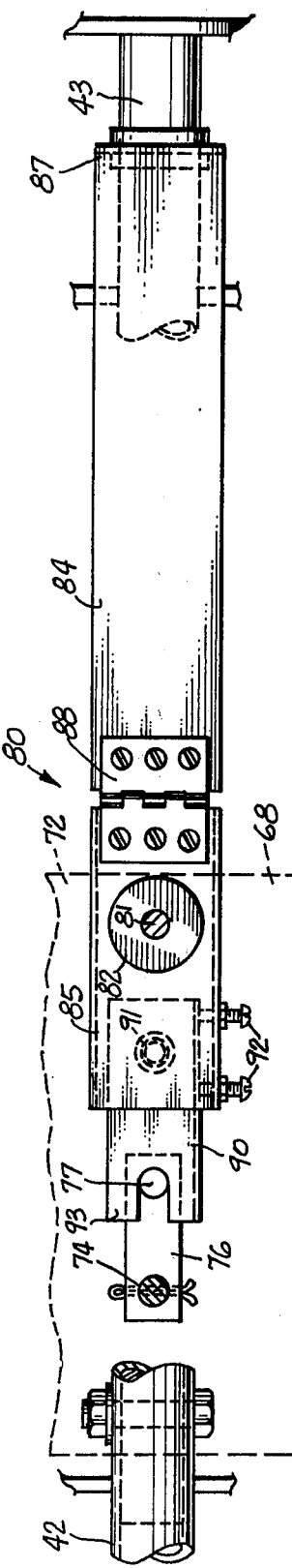

ARTICULATING PIPE COUPLING AND ALIGNMENT CONTROL ASSEMBLY FOR CENTER PIVOT IRRIGATION SYSTEM

BACKGROUND OF THE INVENTION

This invention relates to center pivot sprinkler irrigation equipment and more particularly to articulating pipe coupling and alignment assemblies interconnecting segments of the water distribution conduit.

Center pivot sprinkler irrigation systems generally involve an elevated water distribution pipe that is rotated about a center point. The distribution pipe is propelled by longitudinally space mobile towers. Usually one of the towers, preferably the outermost tower, is adapted to be constantly driven at a pre-determined speed with the intermediate towers being controlled to maintain general alignment between the outer tower and the pivot. Normally the intermediate towers will lag a little behind or proceed ahead of the desired position of alignment causing bending movements to occur in the distribution pipe. Consequently it is desirable to provide pivotal coupling connections between pipe sections to accommodate any angular bending of the distribution pipe both in the horizontal direction and vertical direction. The bending movements are mostly in the horizontal plane about the axis of the distribution conduit, although the pipe may also be subjected to vertical bending moments due to travel of the towers over hilly terraine. Additionally, it is not unusual for substantial tensional and compressional forces to be transmitted along the distribution pipe with transmitting torsional forces. Consequently, it is very important that the coupling between the distribution pipe sections be sufficiently strong to accommodate the various forces while enabling the pipe sections to articulate both in the vertical direction and horizontal direction with respect to each other.

One of the principal objects of the invention is to provide a new articulating coupling and alignment control assembly for interconnecting water distribution pipe sections and is relatively easy to construct and capable of performing the various needed functions.

An additional object of this invention is to provide an assembly that can be readily manufactured with as many common parts as possible to substantially reduce the cost of manufacture and the cost of inventory for replacement parts.

A further object of this invention is to provide an assembly that can be economically manufactured and readily assembled in the field by inexperienced personnel.

A still further object of this invention is to provide an assembly in which an external connection is provided so as not to inhibit the flow of water through the coupling while at the same time maintaining accurate alignment control throughout the length of the distribution conduit.

These and other objects and advantages of this invention will become apparent upon reading the following detailed description of a preferred embodiment.

BRIEF DESCRIPTION OF THE DRAWINGS

A preferred embodiment of this invention is illustrated in the accompanying drawings in which:

FIG. 4 is a fragmentary enlarged side view of the articulating pipe coupling and alignment control assembly illustrated in FIG. 2; and FIG. 5 is a horizontal cross-sectional view taken along lines 5—5 in FIG. 4 illustrating in more detail the alignment control mechanism.

DETAILED DESCRIPTION OF A PREFERRED EMBODIMENT

Figure 1:
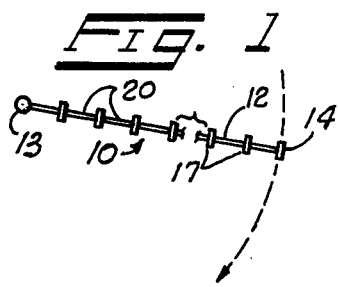
FIG. 1 is a schematic plan view illustrating the operation of the center pivot irrigation system in a field.

Referring now in more detail to the drawings, there is illustrated in FIG. 1 a center pivot sprinkler irrigation system generally designated with the numeral 10. This system includes an elongated water distribution conduit 12 that extends from a center pivot 13 to an end 14. Sprinkler units (not shown) are mounted along the distribution conduit for directing water onto the field as the conduit is transported over the field by spaced mobile towers 17. The water distribution conduit 12 includes a plurality of pipe sections 20. Each pipe section has end flanges 21 with one end flange designated as 21a and the other end flange designated as 21b. Each pipe section 20 is connected to an adjacent pipe section by an articulating pipe coupling assembly 22. Each pipe section is supported between towers 17 by a truss structure 23.

Figure 2:
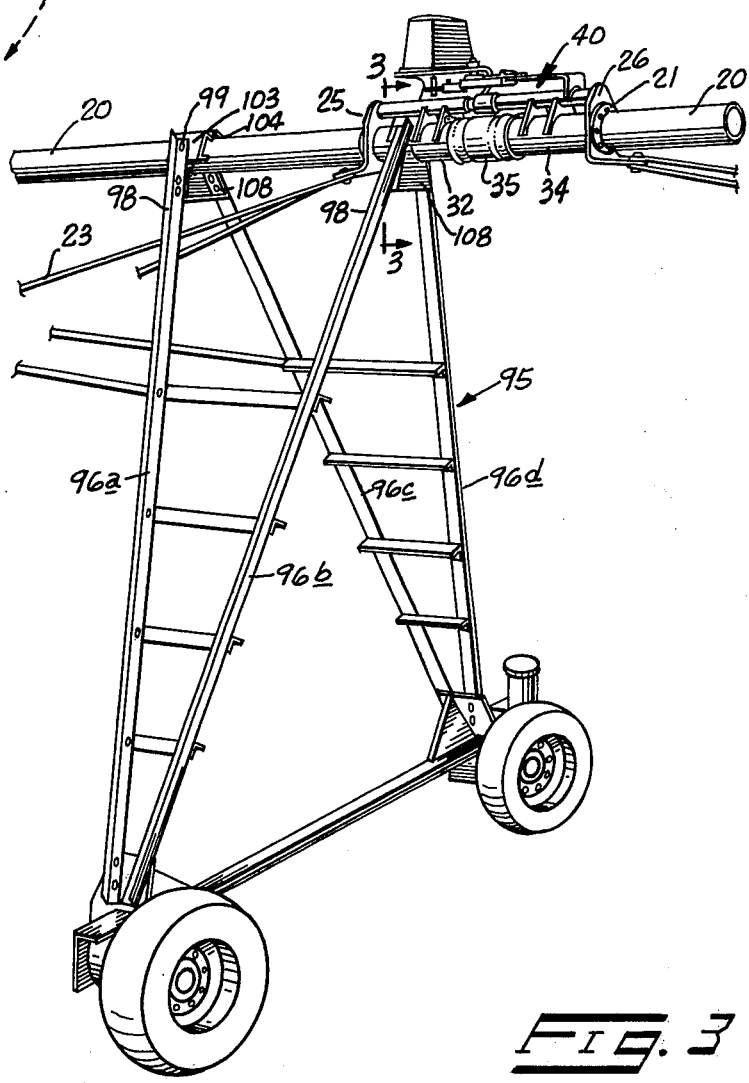
FIG. 2 is a fragmentary side view of a section center pivot sprinkler irrigation system showing an articulating pipe coupling and alignment control assembly in conjunction with a mobile tower.
Figure 3:
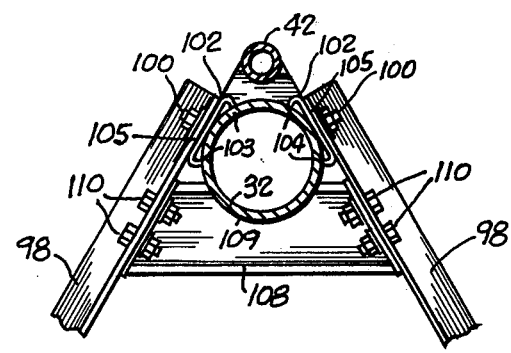
FIG. 3 is a vertical cross-sectional view taken along line 3—3 in FIG. 2 illustrating the attachment of the mobile tower in the articulating pipe coupling and alignment control assembly.

Each articulating pipe coupling assembly 22 includes coupling flanges 25, 26 respectively. Each coupling flange 25, 26 has a vertical section 27 for attaching to a corresponding pipe end flange 21a, 21b. Each coupling flange 25 includes a lower section 28 that extends downward and outward underneath the pipe section for connecting with tie rods of the truss structure as illustrated in FIG. 2. Specifically the lower section 28 connects to tie rods 30 of the truss structure.

Each articulating pipe coupling assembly 22 includes two pipe segments 32 and 34 having diameters complementary to the diameters of the pipe sections 20. The inner ends are designated as 32a and 34a respectively and the outer ends are designated as 32b and 34b respectively.

Coupling assembly 22 further includes a cylindrical coupling member 35 that extends between and over the end 32a and 34a. The coupling member 35 has annular grooves 36 formed adjacent the ends thereof with O-rings 37 formed therein for engaging the exterior of the pipe segments 32 and 34 to provide a liquid seal and to enable fluid to readily flow between the pipe segments 32 and 34.

The articulating pipe coupling assembly 22 further includes an external pivot connection subassembly 40 that operatively structurally interconnects the pipe segments 32 and 34 to permit adjacent pipe sections 20 to pivot angularly with respect to each other and to transmit the tensional and compressional forces without transmitting torsional stresses between the pipe sections.

The external pivot connection subassembly 40 provides an external connection between the pipe segments 32 and 34 without applying compressive or tensional forces to the coupling member 35. The external pivot connection subassembly 40 includes two opposing longitudinally aligned tubes 42 and 43 that are positioned above and affixed to the pipe segments 32 and 34 respectively. It should be noted that the tubes 42 and 43 are mounted at a slight angular orientation with respect to the pipe segments 32 and 34 with the tubes 42 and 43 being longitudinally aligned with each other and the pipe segments 32 and 34 extending slightly downward toward each other from the coupling flanges 25 and 26 toward the coupling member 35. Each of the tubes 42, 43 includes a rear end 45 that is affixed by welding to the upper section 27 of the coupling flanges 25, 26. Each tube 42, 43 has an open end 46 opposing the other. The tubes 42 and 43 are affixed to the pipe segments 32 and 34 respectively by saddle brackets 48.

Detachable stops 50 are mounted to brackets 48 and project toward each other to engage the ends of the coupling member 35 to keep the coupling member 35 centered with respect to the ends 32a and 34a and thereby prevent the coupling member 35 from moving axially during the operation of the irrigation system.

The external pivot connection subassembly 40 further includes a first shaft 52 having an end 53 that projects into tube 42 and an outer end 54 that extends therefrom. End 54 has a threaded bore formed therein to threadably receive a ball stud shaft 55. The stud shaft 55 has a ball 56 mounted on the end thereof. Bolts 57 extend transversely through the tube 42 and the shaft 52 to secure the shaft 52 rigidly thereto to prevent any longitudinal movement within the tube. The bolts 57 enable the assembly to be readily disconnected to remove the first shaft 52.

The external pivot connection 40 further includes a second shaft 58 having an end 58a that extends into the tube 53 and is secured thereto by bolts 59. A socket cap 60 is mounted on an outer end 58b of the second shaft 58. The socket cap 60 has a ball cavity 61 therein complementary to the ball 56. An aperture 62 is formed in the socket cap 60 communicating with the ball cavity 61 to receive and fit over the ball stud shaft 55. A locking pin 63 extends through the socket caps 60 and through the socket shaft 58 to rigidly secure the socket cap 60 to the shaft 58. The ball 55 and socket cavity 61 is directly over the coupling member 35. The external pivot connection 40 permits the coupling assembly to pivot horizontally about a vertical axis and vertically about a horizontal axis defined by the location of the ball 56 and the socket cavity 61.

The system further includes an alignment control box 66 that is supported on a support bracket 68 which in turn is supported on one of the tubes 42, 43. Support bracket 68 has an inverted L-shape cross section with a side portion 70 that is affixed to one side of the tube 42 by the bolts 57. The bracket 68 has a top portion 72 that is substantially horizontal for supporting the alignment control box. Alignment control box 66 includes electrical switching mechanisms for activating electrical circuits for activating and de-activating an electrical motor (not shown) for driving the mobile tower 17. An example of an electrical switching mechanism is illustrated in Pringle U.S. Pat. No. 3,807,436 granted Apr. 30, 1974. Alignment control box 66 includes an electrical switch actuation shaft 74 that projects downward from the box through the top portion 72. A horizontal arm 76 is affixed to the end of the shaft 74 and extends radially outwardly terminating in a vertical pin 77.

The system further includes an alignment arm subassembly 80 that is pivotally mounted to the bracket 68 for movement about a vertical axis that coincides with the vertical pivot axis of the external pivot connection 60. The alignment arm assembly 80 is mounted on a stub shaft 81 that extends downwardly from the bracket portion 72. A plastic bushing 82 is provided to enable alignment subassembly 80 to pivot about the axis of the stub shaft 81. The alignment arm subassembly 80 includes a central arm portion 85 that extends horizontally with a hinged arm section 84 mounted thereto and extending outwardly over the other tube 43. The hinged arm section 84 includes a cradle end 87 that fits over the tube 43 to cause the alignment arm subassembly 80 to pivot in response to the relative pivotal movement between the tubes 42 and 43. A hinge 88 interconnects the arm section 84 which the central section 85 to enable the arm section 84 to pivot up and down about a horizontal axis so as not to transmit the relative vertical movement of the pipe sections 20 to the central portion 85.

The alignment arm subassembly includes an angular adjustment arm section 90 that is rotatably mounted on a stub shaft 91 that is vertically oriented on the section 85 spaced from shaft 81. The arm angular adjustment section 90 is adjusted about the shaft 91 for angular orientation by adjustment bolts 92. The section 90 further includes a bifurcated end 93 that straddles the pin 77. Consequently, the horizontal angular movement of tube 42 with respect to tube 43 causes pivotal movement of alignment arm subassembly 80 about the vertical axis of the ball and socket. Pivotal movement of the alignment arm subassembly 80 rotates the switch actuation shaft 74. Consequently, when the pipe sections 20 become misaligned, the alignment arm subassembly 80 causes actuation of the switching mechanism to energize the electric motor (not shown) to drive the mobile tower 17 forward to maintain general system alignment.

Each mobile tower 17 includes a tower frame 95 that includes tower legs 96a–d. Each tower leg 96 has an upper end 98 having an aperture 99 formed therein that is mounted to a stud bolt 100 that is affixed to pipe segments 32, 34. A bearing plate 102 having bent ends 103 and 104 respectively is mounted over stud bolts 100 with a central portion 105 of the bearing plate 102 engaging the side of the pipe segment 32. The upper ends 98 of tower legs 96 are fit over the stud bolts resting and bearing against the central portions 105. The connection of the tower frame 95 to the distribution conduit 12 further includes a pipe cradle block 108 that extends between tower legs 96a and 96b. The cradle block has a curved surface 109 that is complementary to the exterior surface of pipe segment 32. The cradle block 108 is secured through bolts 110 to the tower legs 96a and 96b to support the articulating pipe coupling and alignment control subassembly on the tower 17.

It should be understood that the above described embodiment is simply illustrative of the principles of this invention and that numerous other embodiments could be readily devised by those skilled in the art without deviating therefrom.

Therefore, only the following claims are intended to define this invention.

What is claimed is:

1. In a center pivot irrigation system having an elongated water distribution conduit supported at intervals by mobile towers for transporting the conduit over a field, in which the conduit is comprised of conduit sections that are pivotally interconnected to each other by articulating pipe coupling and alignment control assemblies and supported between mobile towers by truss structures; each of said articulating pipe coupling and alignment control assemblies comprising:

two longitudinally spaced pipe segments having diameters complementary to the conduit sections;

articulating pipe coupling interconnecting adjacent inner ends of the pipe segments for fluidically interconnecting the pipe segments in a sealed relationship and for enabling each pipe segment to pivot vertically and horizontally with respect to the other pipe segment;

conduit section flanges that are affixed to outer ends of pipe segments, each conduit section flange having, (1 1) an upper portion attached to the ends of the conduit sections; and (2 ) a lower portion that extends downwardly below the conduit sections attaching to the truss structure;

an external pivot connection subassembly for operatively structurally interconnecting the conduit sections to enable each conduit section to angularly move both horizontally and vertically with respect to each other without interferring with the flow of liquid through the pipe segments;

said external pivot connection subassembly having two opposed longitudinally aligned support tubes affixed to and vertically above the pipe segments;

said external pipe connections subassembly having ball and socket articulating means between support tubes with shafts extending into and affixed to respective tubes, said articulating ball and socket means having a ball and socket located vertically above the pipe coupling for enabling the attached conduit sections to pivot horizontally about a vertical axis defined by the ball and socket;

a support bracket mounted on one of the tubes and extending over the one tube;

an alignment control box mounted to the support bracket;

an alignment arm subassembly pivotally mounted to the support bracket for pivotal movement about the vertical axis of the ball and socket; and said alignment arm subassembly having an arm section extending horizontally from the vertical axis over to and engaging the other support tube to cause the alignment control subassembly to pivot about the vertical axis in response to angular movement between attached conduit sections.

2. In the system as defined in claim 1 wherein the ball and socket articulating means includes a ball affixed to an end of a first shaft in which the first shaft extends into and is affixed within one of the support tubes;

a socket affixed on the end of a second shaft that extends into and is affixed within the other support tube; and said socket having a ball cap affixed to the second shaft forming a ball-socket cavity therein with an aperture communicating with the ball-socket cavity to receive the first shaft.

3. In the system as defined in claim 1 wherein the extended arm section is hinged to a central arm section for vertical movement about a horizontal axis.

4. In the system as defind in claim 1 wherein the support tubes have outer ends that are affixed to the upper portions of respective conduit section flanges.

5. In the system as defined in claim 1 wherein the lower portions of each conduit section flange extends downwardly and horizontally outward attaching to truss structure tie rods.

6. In the system as defined in claim 1 wherein one of the pipe segments has stud bolts affixed thereto that extend radially outward from the pipe segments and wherein the system further comprises bearing plates mounted loosely over the stud bolts for supporting leg members of the mobile tower with the leg members connected to the stud bolts.

7. In the system as defined in claim 1 wherein the alignment control box has a switch actuation shaft extending downward therefrom that is horizontally spaced from the vertical axis of the ball and socket and wherein the alignment arm subassembly is pivotally mounted to the support bracket for horizontal pivotal movement about the vertical axis of the ball and socket; and means operatively interconnecting the alignment arm subassembly with the switch actuation shaft of the control box for rotating the switch acutation shaft in response to the pivotal movement of the alignment arm subassembly about the ball and socket vertical axis.

* * * * *